United States Patent
Newton et al.

(10) Patent No.: US 8,191,102 B2
(45) Date of Patent: May 29, 2012

(54) METHOD OF TRANSMITTING INTERACTIVE TELEVISION

(75) Inventors: Philip Steven Newton, Eindhoven (NL); Declan Patrick Kelly, Eindhoven (NL); Jingwei Tan, Shanghai (CN); Jun Shi, Shanghai (CN); Liang Gan, Shanghai (CN)

(73) Assignee: Koninklijke Philips Electronics, N.V., Eindhoven (NL)

( * ) Notice: Subject to any disclaimer, the term of this patent is extended or adjusted under 35 U.S.C. 154(b) by 941 days.

(21) Appl. No.: 10/541,051

(22) PCT Filed: Dec. 5, 2003

(86) PCT No.: PCT/IB03/05789
§ 371 (c)(1),
(2), (4) Date: Jun. 29, 2005

(87) PCT Pub. No.: WO2004/059973
PCT Pub. Date: Jul. 15, 2004

(65) Prior Publication Data
US 2006/0053469 A1    Mar. 9, 2006

(30) Foreign Application Priority Data
Dec. 30, 2002 (EP) .................................. 020805974

(51) Int. Cl.
H04N 7/16 (2011.01)
(52) U.S. Cl. ............................ 725/136; 725/50; 725/142
(58) Field of Classification Search .......... 725/114–117, 725/135, 136, 142, 140, 145–147, 50
See application file for complete search history.

(56) References Cited

U.S. PATENT DOCUMENTS

| | | | | |
|---|---|---|---|---|
| 5,625,693 A | * | 4/1997 | Rohatgi et al. | 713/187 |
| 5,768,539 A | * | 6/1998 | Metz et al. | 709/249 |
| 6,427,238 B1 | * | 7/2002 | Goodman et al. | 725/136 |
| 6,536,041 B1 | * | 3/2003 | Knudson et al. | 725/39 |
| 2004/0128699 A1 | * | 7/2004 | Delpuch et al. | 725/120 |

FOREIGN PATENT DOCUMENTS

| | | | |
|---|---|---|---|
| WO | WO 01/33852 | * | 5/2001 |
| WO | WO0133852 A1 | | 5/2001 |
| WO | WO0201866 A2 | | 1/2002 |
| WO | WO0201866 A3 | | 1/2002 |

OTHER PUBLICATIONS

P. Perrot; DVB-HTML An Optional Declarative Language Within MHP 1.1; Sep. 2001; pp. 1-16.

* cited by examiner

Primary Examiner — Pankaj Kumar
Assistant Examiner — Timothy Newlin

(57) ABSTRACT

A method (1) of transmitting interactive television, whereby interactive television applications are transmitted inside application-modules. These modules are transmitted in a broadcast stream. Recording systems cannot decide which modules are to be recorded. Therefore storage related information of said modules is signalled in the broadcast stream. Module identification information related is implemented in the Application Information Table (AIT) and/or in the Download Information Indication (DII) message. Thus information is included in the broadcast stream concerning categories stating whether application modules are mandatory, optional or forbidden to record. Alternatively properties of a module are chosen from Code/Data/Both and/or Fixed/Variable. Recording systems use this information do decide if application modules are to be recorded or disregarded. Alternatively, application module identification information is transmitted in said broadcast stream. A module identification number is used to avoid multiple recordings. Application modules having the same category are preferably grouped together.

15 Claims, 3 Drawing Sheets

METHOD OF TRANSMITTING INTERACTIVE TELEVISION

Figure 1:
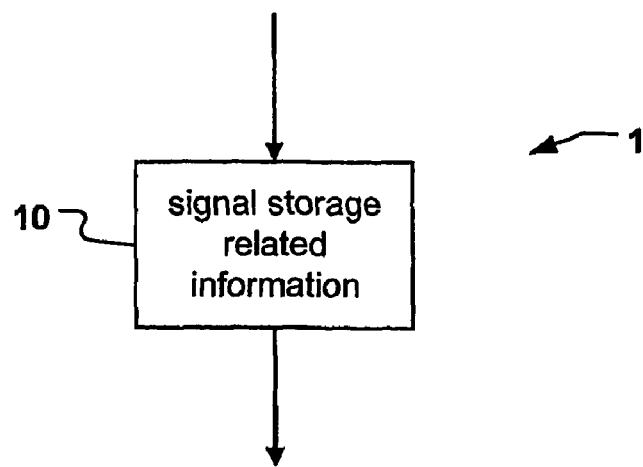

This invention relates in general to the field of interactive television and more particularly to the recording of interactive television contents and even more particularly to handling of applications in the field of recording of interactive television contents.

Interactive television (iTV) is becoming more and more popular. An example of interactive television is the Multimedia Home Platform (MHP), which is a digital video broadcasting (DVB) standard intended to combine digital television (DTV) with interactivity and access to the Internet and the World Wide Web. DTV service providers offer a large variety of audio-visual (A/V) television programs and also of applications allowing the interaction of the viewer/user with the TV set and its contents.

Similar to today's video recorders for analogue television broadcasts using video tapes for recording broadcast streams, digital video recorders for interactive television are developed using either a harddisk or removable media such as optical discs for storing recorded broadcasts. The digital video recorders for interactive television record both A/V television contents and applications for playback at a later point in time.

MHP applications are transmitted inside modules through a Digital Storage Media Command and Control (DSMCC) object carousel. The DSMCC object carousel defines how and when to send modules/files down a broadcast channel. There is no connection to the server for a receiving device to ask for wanted files. All files are repeatedly sent all the time, e.g. once per 10 seconds. MHP terminals look for the files they need as they come round. The modules contain the files that the MHP application needs to run. Some files are part of an application itself. Whilst other files can be left out or only have relevance a particular instance, for example configuration files. For example, a broadcaster develops a segmented latest news application and transmits this together with the latest news. The broadcaster develops the application only once, as it is configured for the news of a particular day by use of e.g. update configuration or metadata files.

Thus, when recording MHP applications, some modules might not need to be recorded. It is a problem that the MHP recording system cannot determine which modules are to be recorded and which are not to be recorded. Furthermore, not all the modules may contain files that are necessary to record, e.g. some modules may contain files, such as configuration files, that must always be loaded from the live broadcast stream in order to have the application up-to-date when the application is run. On the other hand, some files have to be recorded, in order to be able to run the recorded application at a later point of time, as the application program file will not be available at that point of time.

Furthermore, it is a problem that storage space is limited on every storage media. Therefore it is desirable to keep the amount of space used for recording applications on a storage medium as low as possible, in order to be able to record as much iTV content as possible on the storage medium.

The present invention overcomes the above-identified deficiencies in the art and solves the above problems by providing a method, an apparatus and a signal according to the appended independent claims.

The general solution according to the invention is to signal recording/storage related properties of the modules, i.e. to signal e.g. which modules are mandatory and which modules are optional to record, and/or to signal other properties, which allow optimisation of recording.

More particularly, in order to enable the recording system to determine which modules are to be recorded, it is, according to a preferred embodiment of the invention, indicated in the iTV broadcast which modules are mandatory to record and/or which modules are optionally to record and/or which modules are forbidden to record. According to an embodiment of the invention, the broadcaster signals, e.g. in the Application Information Table (AIT) and/or in the Download Information Indication (DII) message, which modules are optional and which modules are compulsory or forbidden to record. Compulsory modules contain files that are critical for running the application from storage. Optional modules contain files that offer the application extra features or contain configuration files that always must be loaded from the live broadcast.

According to one aspect of the invention, a method is provided, which is a method of transmitting interactive television whereby at least an interactive television application is transmitted inside DMSCC-modules in a broadcast stream. The method comprises the step of signalling storage related information of the modules in said broadcast stream.

According to another aspect of the invention, another method is provided, which is a method for receiving an interactive television broadcast stream for recording, whereby at least an interactive television application carried in modules is transmitted in the broadcast stream. The method comprises the steps of extracting storage related information of said modules in said broadcast stream and recording of modules which are mandatory to record. The recording is based on the storage related information, i.e. the storage related information is used as control information on whether to record the application or not.

According to yet another aspect of the invention, an apparatus for recording and/or playing back interactive television is provided. The apparatus is adapted to record interactive television from a broadcast transport stream (TS) to a storage medium. Optionally, the apparatus is also adapted to playing back interactive television from a storage medium. The apparatus comprises means for extracting storage related information of said modules from said broadcast stream, and means for recording of these modules, whereby only modules are recorded for which the storage related information allows recording.

According to a further aspect of the invention, a computer-readable medium having embodied thereon a computer program for processing by a computer is provided. The computer program comprises a code segment for signalling storage related information of modules in an interactive television broadcast-stream, whereby at least an interactive television application is transmitted inside application modules, preferably DSMCC-modules, in a broadcast stream.

According to yet a further aspect of the invention a signal for transmitting interactive television is provided. The signal comprises a broadcast transport stream of interactive television contents. The contents comprises at least an interactive television application, whereby the latter comprises modules being transmitted by said signal. The signal comprises modules, and storage related information and/or module identification information in the broadcast stream.

According to another aspect of the invention, a graphical user interface for an interactive television DSMCC generator is provided for specification of storage related information of modules to be transmitted inside DSMCC-modules in a broadcast stream.

Preferably, the application-modules are transported inside DSMCC-modules in the broadcast stream.

Figure 2:
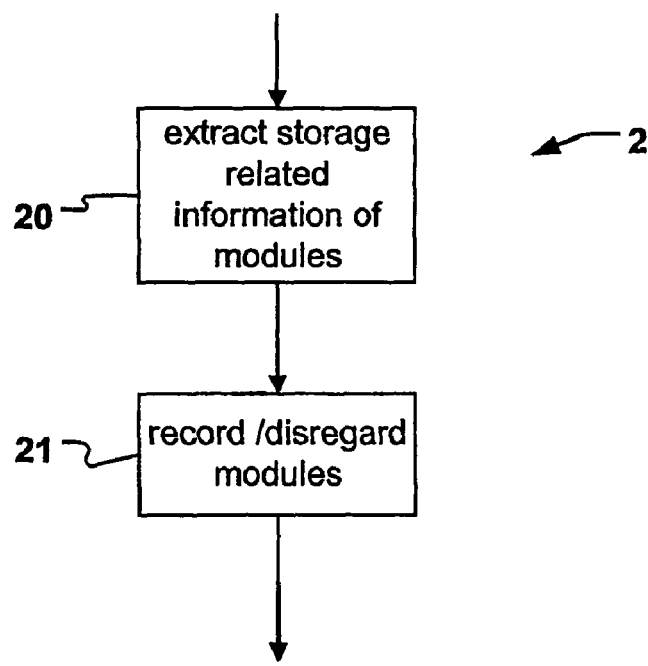
Figure 3:
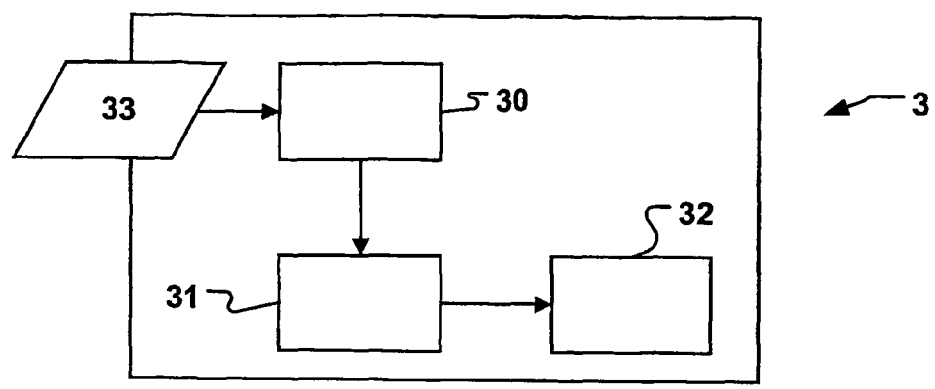
Figure 4:
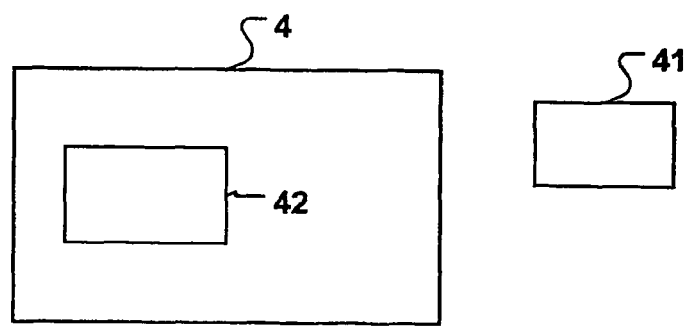
Figure 5:
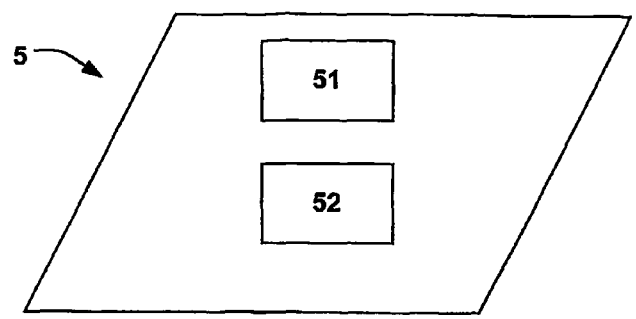
Figure 6:
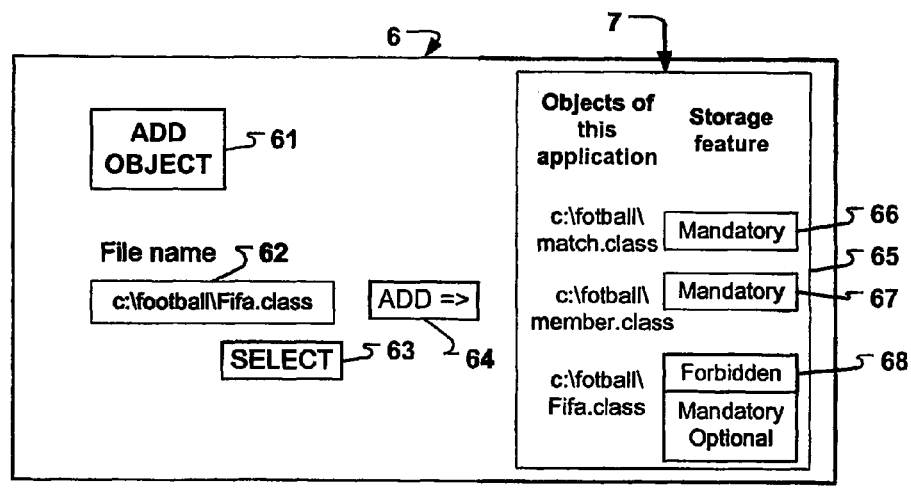

Preferred embodiments of the present invention will be described in the following detailed disclosure, reference being made to the accompanying drawings, in which FIG. 1 shows a flow chart of an embodiment of the invention, FIG. 2 shows a flow chart of another embodiment of the invention, FIG. 3 illustrates in a schematic diagram an apparatus according to an embodiment of the invention, FIG. 4 shows a schematic diagram of a computer-readable medium according to another embodiment of the invention, FIG. 5 is a schematic diagram of a signal according to yet another embodiment of the invention, and FIG. 6 is a schematic diagram of a user interface according to another embodiment of the invention.

The term "modules" as used in the disclosure of the present invention is defined as logical entities, which are used in the transmission of files. The mentioned (DSMCC) object carousel is generally designed to broadcast an entire directory/file structure. It does this by encapsulating the files into objects and transmitting the directory names and the files themselves in special types of objects, i.e. directory objects and file objects. The directory objects contain preferably the name and the path of the files under that directory. The file objects carry the files. These objects in their turn are transported in groups of e.g. two or three, depending on the size of the objects. These groups are the logical entities referred to as "modules". At the receiving end when the modules are received some modules may contain objects, which in turn may encapsulate files, which do not need to be recorded or which are mandatory to record. The invention allows the receiving end to determine which modules are mandatory to record and which need not be recorded.

In a preferred embodiment of the invention according to FIG. 1, a method 1 includes the step 10 of signalling storage related information of modules in an interactive television broadcast stream.

In another embodiment of the invention, signalling this storage related information is implemented in the Application Information Table, abbreviated AIT. The AIT includes an extra file and/or a sub-table and/or the application storage descriptor that contains the list of module IDs and a field containing information on the storage characteristics of respective module. In an example of this preferred embodiment, according to Table 1, the AIT includes an extra subsection that contains the list of module IDs (moduleID) and/or a field (storage_feature) stating whether respective module is mandatory, optional or forbidden to record. In the example of Table 1, information for N modules is provided by a loop running from N=0 to N=(N−1), whereby the exemplary application possesses N modules.

TABLE 1

| Syntax of application storage descriptor | | |
|---|---|---|
| No. of Bits | | Identifier |
| application_storage_descriptor( ) { | | |
| descriptor-tag | 8 | uimsbf |
| descriptor-length | 8 | uimsbf |
| storage_property | 8 | uimsbf |
| not_launchable_from_broadcast | 1 | bslbf |
| reserved | 7 | bslbf |
| version | 32 | uimsbf |
| priority | 8 | uimsbf |

TABLE 1-continued

| Syntax of application storage descriptor | | |
|---|---|---|
| No. of Bits | | Identifier |
| modulesCount(N) | 16 | uimsbf |
| For(i=O; i<N; i++) | | |
| { | | |
| moduleID | 16 | uimsbf |
| storage_feature | 2 | uimsbf |
| } | | |
| } | | |

In this way, a storage feature is defined for each module comprised in an application, whereby the application comprises at least one module.

A non-limiting example is to define the storage feature field (storage_feature) as 0 corresponding to forbidden, 1 to mandatory and 2 to optional. In the example according to Table 1, two bits are reserved for this purpose.

Alternatively, a module description file is defined, which lists the module's ID (module ID) and its storage feature (storage_feature). This file is generated by the DSMCC generator or the MHP mux and not by the user. This file can be generated according to the extension a file has or by a determining which files are application files and which files are (meta)data The application files must always be recorded for an application to work.

According to a further preferred embodiment of the invention, the indication of mandatory, optional or forbidden to record is implemented in the Download Information Indication (DII) message of the broadcast stream.

There is one moduleInfo loop in the DII message, and one userInfo loop in the Broadcast Inter Object Request Broker Protocol (BIOP) moduleInfo loop. According to the embodiment of the invention, the indication is placed in the userInfo field. An example for a descriptor is defined according to Table 2.

TABLE 2

| Descriptor structure example | | |
|---|---|---|
| No. of Bits | | Identifier |
| record-option descriptor { | | |
| descriptor_tag | 8 | uimsbf |
| option_type | 2 | uimsbf |
| } | | |

In this example, the descriptor_tag is used to identify the descriptor, whereas the option_type is used to discriminate the indication of the modules' recording option. The option_type is in a non-limiting example defined as option_type=0 corresponding to forbidden, option_type=1 corresponding to mandatory and option_type =2 corresponding to optional.

A combination of the above two preferred embodiments forms another embodiment of the invention. The AIT e.g. includes the list of application files related to an application and the DII message indicates the storage feature of the particularapplication file in a certain module, wherein the modules are related to the broadcast in the object carousel, as mentioned above.

To implement the above methods, the user needs to give input information on the file level, i.e. which files are mandatory and which files are optional. This is implemented in the DSMCC generator or MHP Mux. Necessary information is generated in the AIT or DII message.

That means that new features/functions are added to the DSMCC generator/MHP mux.

In the following, two examples of User Interfaces (UI) for the MHP Mux of this feature will be given:

Firstly, when adding files or objects of the MHP application in the MHP Mux, each file will have a checkpoint to show whether it is mandatory or optional. An example for such a UI is illustrated in FIG. 6.

The user is asked to choose if a file is mandatory or not and the default choice is mandatory. Another way is to ask the user to choose mandatory files first and then to specify the others.

Secondly, in the MHP 1.1 standard, there is an Application Description File for storable applications. This files' storage feature is modified. It is important, that the DSMCC generator or MHP mux understands this file and gets each object's storage feature information from it.

In order to check with the user, the MHP Mux e.g. pops up a window to show each file's storage feature based on this application's description file.

In addition to the above, a broadcaster may broadcast the same application with a plurality of programmes. The same application is e.g. regularly sent with football highlights programmes. By introducing further signalling in the broadcast, the storage system is optimised, i.e. applications are only stored once on a specific storage medium, thus saving storage space. The invention takes in this case advantage of the application identifier, which is defined and included in the AIT. It consists of two fields, an organisation_id (32 bits) and an application_id (16 bits). These values are used to identify the same application in different broadcasts.

In another embodiment, the following properties of a module are signalled:
a) Code/Data/Both and/or
b) Fixed/Variable.

According to this semantics, a module flagged as Code indicates that the files included in the module are executable code (xlets), whereas a module flagged as Data does not contain any code files. The Fixed/Variable flag indicates if the content of this module is fixed for each broadcast of the application or variable. Fixed modules need only be stored once, whereas variable modules need to be stored each time and linked to the specific recording.

In the case that modules are mandatory to record, i.e. the application cannot run without them, and the modules are furthermore flagged as Fixed, they do not have to be recorded if they already have been previously recorded on the same storage medium. In this way, multiple recording is avoided, and storage space is not unnecessarily occupied on the storage medium.

According to yet another embodiment of the invention, the system groups files when generating the DSMCC carousel, in order to make the best use of the above mentioned flags. Fixed files are grouped together in modules. Code files and data files are grouped together and stored separately. In this way, the storage of the modules is optimised, i.e. access to the files is generally faster. Furthermore, the implementation of a recording system may be simplified, when equipped with a file version control. Generally, data files change more often then code files. Therefore, a separate version control for both file categories is preferably used.

As described above, this module related storage information is signalled in the AIT and/or the DII message. The above-described syntax of the previous embodiments is in this case extended to add this further information.

FIG. 2 shows a flow chart of a method 2 according to a preferred embodiment of the invention. The method 2 is a method for receiving an interactive television broadcast stream for recording, whereby at least an interactive television application transmitted inside object carousel modules is comprised in the broadcast stream. The method 2 comprises the step 20 of extracting storage related information of said modules in said broadcast stream and the step 21 of recording modules which are mandatory or optional to record. The recording is based on the storage related information extracted in step 20, i.e. the obtained storage related information is used as control information on whether to record the application or not.

FIG. 3 illustrates in a schematic diagram an apparatus according to an embodiment of the invention. According to FIG. 3, an apparatus 3 for recording and/or playing back interactive television is provided. The apparatus is adapted to record interactive television from a broadcast transport stream (TS) 33 to a storage medium 32. Optionally, the apparatus 3 is also adapted to playing back interactive television from a storage medium 32. The apparatus comprises means 30 for extracting storage related information of said modules from said broadcast stream, and means 31 for recording of modules. Means 30 and 31 are operatively connected in order to only record modules from the TS for which the storage related information allows or permits recording.

In FIG. 4 a schematic diagram of a computer-readable medium 4 according to another embodiment of the invention is shown. The computer-readable medium 4 has embodied thereon a computer program for processing by a computer 41. The computer program comprises a code segment 42 for signalling storage related information of application modules in an interactive television broadcast stream.

A schematic diagram of a signal 5 according to yet another embodiment of the invention, is illustrated in FIG. 5. The signal 5 is a signal for transmitting interactive television contents including applications. The signal 5 comprises a broadcast transport stream of interactive television contents. The contents comprises at least an interactive television application 51, whereby the latter comprises modules being transmitted by the signal 5. The signal 5 comprises modules, and storage related information 52 and/or module identification information in the broadcast stream.

An example for elements comprised in a layout of a user interface 6 according to another embodiment of the invention is shown in FIG. 6. A graphical user interface 6 for an interactive television DSMCC generator is provided for specification of storage related information of application modules to be transmitted in a broadcast stream. FIG. 6 depicts an example of a screen shot of said user interface. An indicator 61 shows that an apparatus for configuring applications for interactive television, which uses the graphical interface, is in the Add Object Mode. In a window 62, a file name for an application to be configured is by appropriate means, such as a keyboard or a mouse, entered and displayed and then selected by a button 63. By application of button 64, the application entered in window 62 is transferred to the window 65 shown on the right side of FIG. 6. This window 65 contains a list 7 of applications and their storage feature. In the example of FIG. 6, the applications "match" and "member" are previously set to mandatory. The application "Fifa" has been transferred to window 65 by pressing button 64. The storage information of the application "Fifa" is selected with a button 68, e.g. from a dropdown list appearing, when pressing button 68.

The present invention has been described above with reference to specific embodiments. However, other embodiments than the preferred above are equally possible within the scope of the appended claims, e.g. any form of interactive TV, such as MHP, OpenTV, Digital TV Application Software Environment (DASE), or storage media such as DVD, SFFO (Small Form Factor Optical Storage), etc. Furthermore an application might use a plurality of modules, and hardware or software can perform the invention. Equally, other coding methods for the storage related information and other ways of implementing the storage related information in the broadcast stream are possible.

Furthermore, the term "comprising" does not exclude other elements or steps, the terms "a" and "an" do not exclude a plurality and a single processor or other unit may fulfill the functions of several of the units or circuits recited in the claims.

The invention may be summarised as a method (1) of transmitting interactive television, such as MHP, whereby interactive television applications are transmitted inside application-modules, preferably DSMCC-modules. These modules are transmitted in a broadcast stream. Recording systems for interactive television cannot decide which modules are to be recorded. Therefore storage related information of said modules is signalled in the broadcast stream. Module identification information is implemented in the Application Information Table (AIT) and/or in the Download Information Indication (DII) message. Thus information is included in the broadcast stream concerning categories stating whether application modules are mandatory, optional or forbidden to record. Alternatively properties of a module are chosen from Code/Data/Both and/or Fixed/Variable. Recording systems use this information do decide if application modules are to be recorded or disregarded. Alternatively, application module identification information is transmitted in said broadcast stream. A module identification number is used to avoid multiple recordings. Application modules having the same category are preferably grouped together. Storage space on recordable media for interactive television is thus used more efficiently and recording of the modules is generally faster.

The invention claimed is:

1. A method of transmitting interactive television, whereby at least an interactive television application is transmitted inside application-modules in a broadcast stream that includes television content, wherein said method facilitates recording of said broadcast stream at a receiver, said method comprising the step of:
    including storage related information for each of said application-modules of the interactive application in said broadcast stream; and
    transmitting said broadcast stream including said application-modules and said storage related information, wherein said storage related information categorizes each said application-module alternatively as (i) mandatory for recording, (ii) optional for recording or (iii) forbidden for recording at the receiver, wherein the mandatory application-modules contain files that are critical for running the corresponding interactive application from storage, and wherein the optional application-modules comprise non-mandatory application-modules for use when running the corresponding interactive application from storage which contain (a) files that offer the corresponding interactive application extra features and (b) configuration files of the corresponding interactive application that must always be downloaded from a live broadcast stream in order to have the corresponding interactive application up-to-date when the corresponding interactive application is run.

2. The method as claimed in claim 1, wherein said interactive television application is transmitted as at least one application object inside DSMCC-modules in said broadcast stream.

3. The method as claimed in claim 2, wherein said at least one application object comprises at least one application file object and at least one application directory object, said application file object comprising at least one application file and said at least one application directory object comprising storage directory information on respective application file.

4. The method as claimed in claim 1, wherein said storage related information further comprises:
    module identification information.

5. The method as claimed in claim 4, wherein the step of including storage related information comprises:
    including said storage related information in an Application Information Table (AIT) and/or in a Download Information Indication message.

6. The method as claimed in claim 4, wherein said module identification information is defined and included in an Application Information Table (AIT) and consists of an application identifier having two fields, the first field being an organisation_id and the second field being an application_id, wherein said organization_id and said application_id values are used to identify identical applications in different broadcasts so that, with respect to recording of said broadcast stream at the receiver, any given application is stored only once on a specific storage medium.

7. The method as claimed in claim 1, wherein said storage related information further comprises properties of an application-module chosen from
    a) Code and/or Data and/or
    b) Fixed or Variable, wherein each application-module property is flagged via a corresponding flag as one selected from the group consisting of
    a): $a_1$) code, $a_2$) data, and $a_3$) both code and data, and
    b): $b_1$) fixed and $b_2$) variable.

8. The method as claimed in claim 7, wherein a Digital Storage Media Command and Control generator generates groups of application-modules with similar storage related information via use of the application-module property flags in an object carousel for broadcasting, wherein fixed files are grouped together, and wherein code files are grouped together, data files are grouped together, and the grouped together code files and the grouped together data files are stored separately in respective separate modules.

9. A method of receiving an interactive television broadcast stream for recording, whereby at least an interactive television application is comprised in the broadcast stream inside application-modules, said method comprising the steps of:
    extracting storage related information for each of said application-modules of the interactive application from said broadcast stream; and
    recording application-modules which are mandatory for recording, based on said storage related information, wherein said storage related information categorizes each said application-module alternatively as (i) mandatory for recording, (ii) optional for recording or (iii) forbidden for recording at a receiver, wherein the mandatory application-modules contain files that are critical for running the corresponding interactive application from storage, and wherein the optional application-modules comprise non-mandatory application-modules for use when running the corresponding interactive application from storage which contain (a) files that offer the corresponding interactive application extra features and (b) configuration files of the corresponding interactive application that must always be downloaded from a live broadcast stream in order to have the corresponding interactive application up-to-date when the corresponding interactive application is run.

10. The method as claimed in claim 9, wherein said method further comprises the step of:

recording application-modules which are optional for recording, based on said storage related information.

11. The method as claimed in claim 9, wherein said method further comprises the steps of:

identifying identical application-modules in different broadcasts, and storing only one copy of identical application-modules on a specific storage medium.

12. The method as claimed in claim 9, whereby said interactive television is MHP, OpenTV or DASE.

13. An apparatus for recording and/or playing back interactive television, said apparatus being adapted to record and/or playback an interactive television broadcast stream to and from a storage medium, said apparatus being adapted to receive said interactive television broadcast stream, said broadcast stream including television content, an interactive television application contained in modules, and storage related information for each of said modules, said apparatus comprising:

means for extracting said storage related information of said modules of the interactive application from said broadcast stream; and means for recording said modules in dependence on said storage related information, wherein said storage related information categorizes each said module alternatively as (i) mandatory for recording, (ii) optional for recording or (iii) forbidden for recording at a receiver, wherein the mandatory modules contain files that are critical for running the corresponding interactive application from storage, and wherein the optional modules comprise non-mandatory application-modules for use when running the corresponding interactive application from storage which contain (a) files that offer the corresponding interactive application extras features and (b) configuration files of the corresponding interactive application that must always be downloaded from a live broadcast stream in order to have the corresponding interactive application up-to-date when the corresponding interactive application is run, and said means for recording being adapted to record only modules for which said storage related information allows recording.

14. The apparatus as claimed in claim 13, wherein said storage related information comprises module identification information for modules, and wherein said apparatus further comprises:

means for preventing recording of more than one application module in different broadcasts with identical module identification information on a storage medium in said apparatus.

15. A non-transitory computer-readable medium having embodied thereon a computer program for processing by a computer, said computer program causing said computer to prepare and transmit an interactive television broadcast stream facilitating recording by a receiver, the computer program comprising:

a code segment for causing the computer to include application modules and storage related information for each of the application modules in an interactive television broadcast stream, at least an interactive television application being included inside said application modules, and a code segment for causing the computer to transmit the interactive television broadcast stream, wherein said storage related information categorizes each said application module alternatively as (i) mandatory for recording, (ii) optional for recording or (iii) forbidden for recording, wherein the mandatory application modules contain files that are critical for running the corresponding interactive application from storage, and wherein the optional application modules comprise non-mandatory application modules for use when running the corresponding interactive application from storage which contain (a) files that offer the corresponding interactive application extra features and (b) configuration files of the corresponding interactive application that must always be downloaded from a live broadcast stream in order to have the corresponding interactive application up-to-date when the corresponding interactive application is run.

\* \* \* \* \*